(12) United States Patent
Mikami

(10) Patent No.: US 10,178,276 B2
(45) Date of Patent: Jan. 8, 2019

(54) PRINTING APPARATUS INCLUDING NFC TAG, METHOD RELATED THERETO, AND STORAGE MEDIUM

(71) Applicant: CANON KABUSHIKI KAISHA, Tokyo (JP)

(72) Inventor: Fumio Mikami, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 15/394,480

(22) Filed: Dec. 29, 2016

(65) Prior Publication Data
US 2017/0201650 A1    Jul. 13, 2017

(30) Foreign Application Priority Data

Jan. 13, 2016  (JP) ................................. 2016-004597

(51) Int. Cl.
*H04N 1/44*  (2006.01)
*H04N 1/00*  (2006.01)
*G06K 7/10*  (2006.01)

(52) U.S. Cl.
CPC ....... *H04N 1/4426* (2013.01); *G06K 7/10366* (2013.01); *H04N 1/00307* (2013.01); *H04N 1/00315* (2013.01); *H04N 2201/0094* (2013.01)

(58) Field of Classification Search
None
See application file for complete search history.

(56) References Cited

U.S. PATENT DOCUMENTS 9,787,860 B2 * 10/2017 Okazawa ........... H04N 1/00106
2016/0065759 A1 * 3/2016 Sakaguchi ......... H04N 1/00307
358/1.15

FOREIGN PATENT DOCUMENTS

JP            2015-130637 A       7/2015

* cited by examiner

*Primary Examiner* — Thomas D Lee
(74) *Attorney, Agent, or Firm* — Canon U.S.A., Inc. IP Division

(57) ABSTRACT

A printing apparatus includes a card reader that reads a card for user authentication, a near field communication (NFC) tag, a memory that stores instructions, and a processor that executes the instructions to determine whether the card reader reads the NFC tag and determine, based on a result of the determination, an operation method of the NFC tag.

15 Claims, 8 Drawing Sheets

FIG.2

SSID Attribute Value = "DIRECT-1F_maker10"

Network Key Attribute Value = "1234567890"

Identity Attribute Value = "192.168.0.199"

Device Info TLV Value = "maker MF8500CS eries"

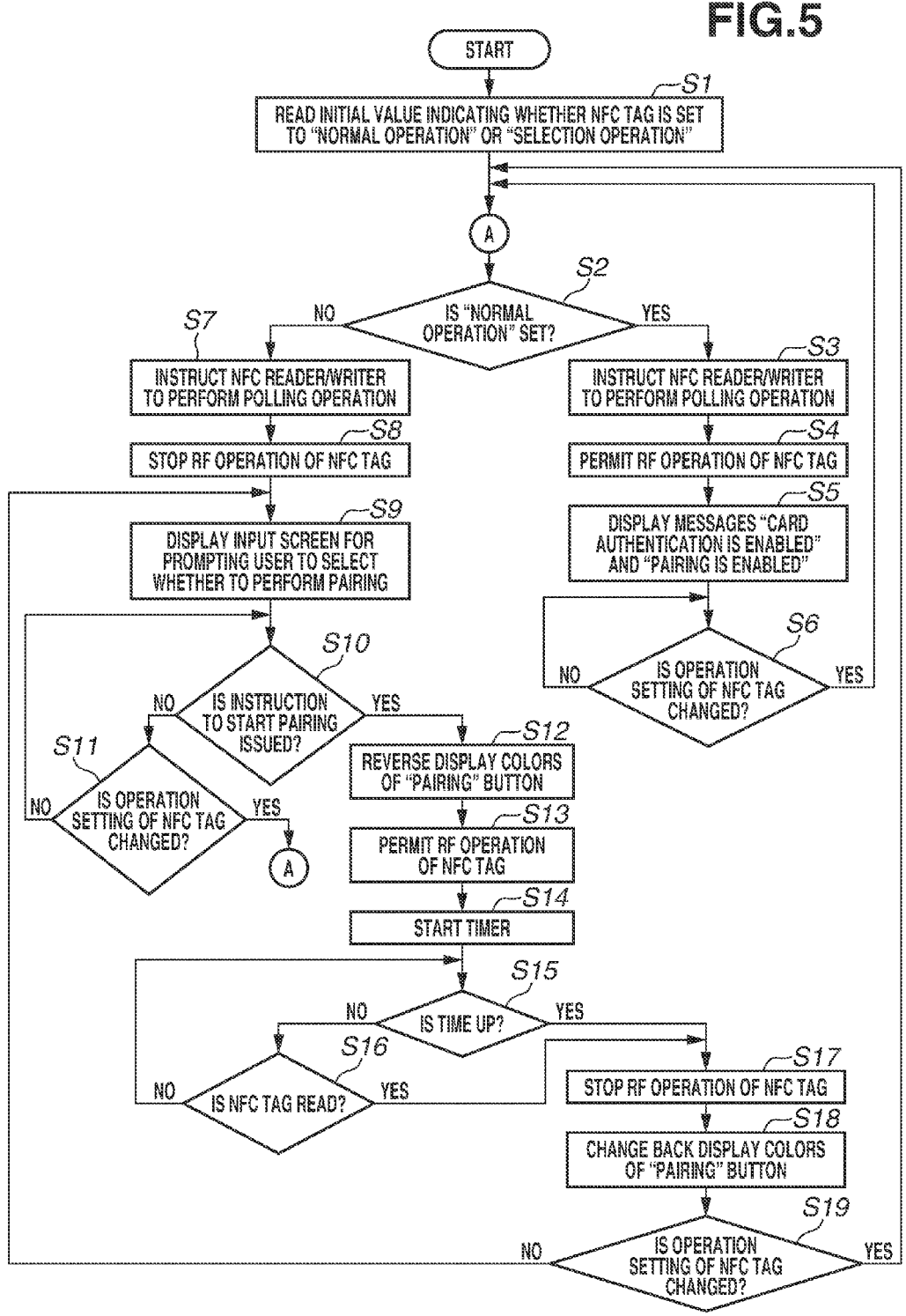

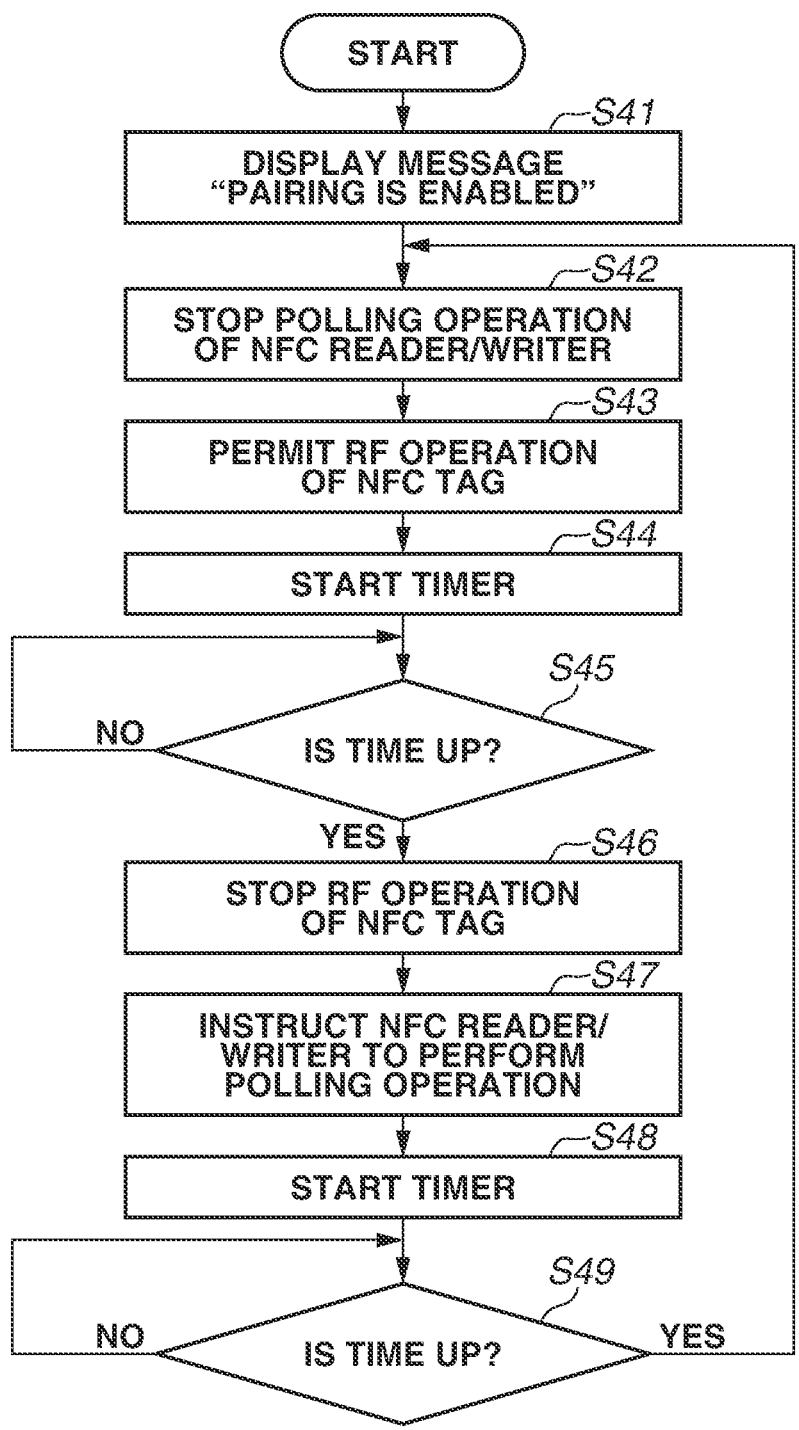

PRINTING APPARATUS INCLUDING NFC TAG, METHOD RELATED THERETO, AND STORAGE MEDIUM

BACKGROUND

Field

The present disclosure relates to a printing apparatus including a near field communication (NFC) tag, a method related thereto, and a storage medium.

Description of Related Art

Examples of a device including an authentication function using an NFC card reader and the function of causing a mobile terminal to read an NFC tag to perform pairing include a printing apparatus. Japanese Patent Application Laid-Open No. 2015-130637 discusses a technique for providing notification of information for establishing a Wi-Fi® connection using NFC.

If an NFC reader/writer for use in authentication is placed in proximity to an NFC tag, the NFC reader/writer can erroneously read the NFC tag, and the NFC reader/writer cannot properly perform an authentication operation.

SUMMARY

According to an aspect of the present invention, a printing apparatus includes a card reader configured to read a card for user authentication, a near field communication (NFC) tag, a memory that stores instructions, and a processor that executes the instructions to determine whether the card reader reads the NFC tag, and determine, based on a result of determining whether the card reader reads the NFC tag, an operation method of the NFC tag.

Further features will become apparent from the following description of exemplary embodiments with reference to the attached drawings.

BRIEF DESCRIPTION OF THE DRAWINGS

FIG. 2 illustrates data.

FIG. 5 is a flowchart illustrating information processing.

FIG. 8 is a flowchart illustrating information processing.

DESCRIPTION OF THE EMBODIMENTS

Exemplary embodiments will be described below based on the attached drawings.

Figure 1:
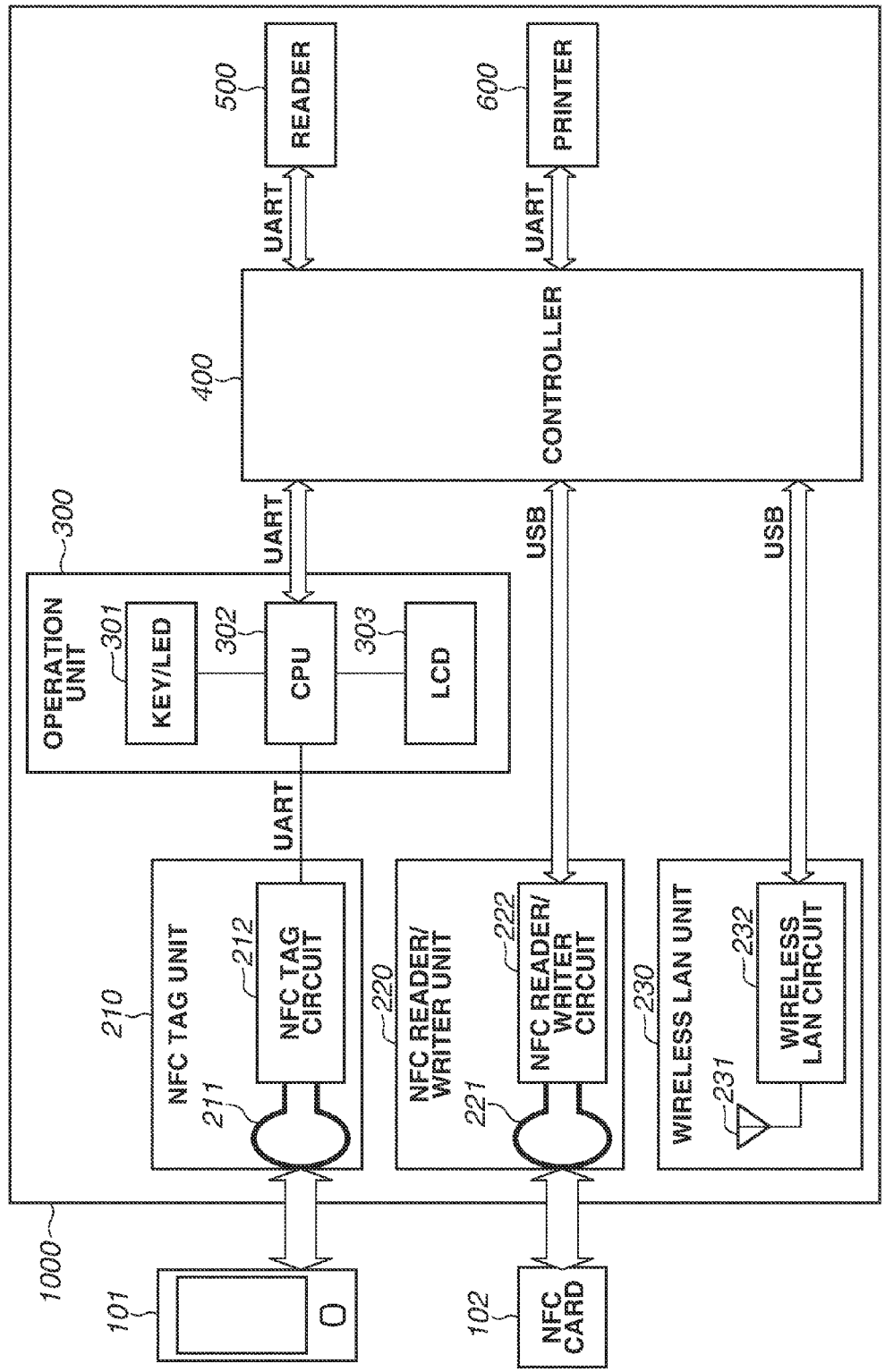
FIG. 1 is a block diagram illustrating a hardware configuration of a multifunction peripheral (MFP).

A first exemplary embodiment will now be described. FIG. 1 is a block diagram illustrating an example of a hardware configuration of a multifunction peripheral (MFP) 1000 according to the present exemplary embodiment. The MFP 1000 includes an NFC tag unit 210, and NFC reader/writer unit 220, a wireless LAN unit 230, an operation unit 300, a controller 400, a reader 500, and a printer 600.

When a mobile terminal 101 performing an NFC reader/writer operation is held over an antenna 211 of the NFC tag unit 210, the mobile terminal 101 reads information stored in an NFC tag circuit 212. The read information is pairing information for performing wireless communication using a wireless local area network (LAN). The pairing information includes character strings including a service set identifier (SSID) and a key.

The controller 400 notifies a central processing unit (CPU) 302 of the pairing information in advance via a universal asynchronous receiver/transmitter (UART). The pairing information is written in a non-volatile storage area of the NFC tag circuit 212 that is connected to the CPU 302 via a UART. In the non-volatile storage area, a particular character string indicating that the NFC tag unit 210 is an NFC tag unit built into the MFP 1000 is also written according to an NFC Data Exchange Format (NDEF). More specifically, the following items are written in the non-volatile storage area:

SSID: SSID Attribute Value;
Key: Network Key Attribute Value;
IP address: Identity Attribute Value; and
Device name: Device Info TLV Value.

An example of the data associated with these items is illustrated in FIG. 2.

The mobile terminal 101 uses the read pairing information and connects to the MFP 1000 via an antenna 231 of the wireless LAN unit 230 using a wireless LAN. The mobile terminal 101 connects to the MFP 1000 through the above-described procedure and performs an operation of transmitting print data to the MFP 1000 or the operation of receiving data read by the MFP 1000.

A card authentication operation will now be described. The NFC reader/writer unit 220 is controlled by the controller 400 via a Universal Serial Bus (USB) interface to perform a polling operation. When an NFC card 102 used for authentication is held over an antenna 221, the NFC reader/writer unit 220 reads information in the NFC card 102. The controller 400, which is connected to the NFC reader/writer unit 220 via an NFC reader/writer circuit 222 using the USB interface, is notified of the read information. The controller 400 determines whether a user is authenticated based on the acquired card information. If the user is authenticated, the controller 400 enables the user to log into the MFP 1000 and access the MFP 1000.

Figure 3:
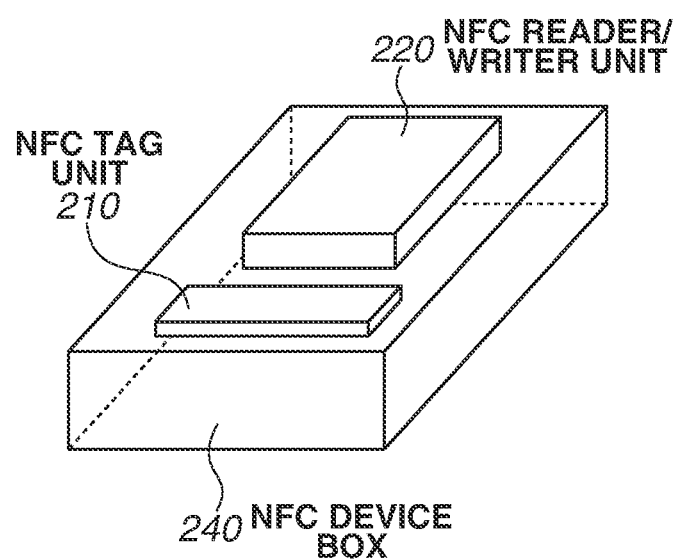
FIG. 3 is an external view of a near field communication (NFC) device box.

FIG. 3 illustrates an external view of an NFC device box 240 that includes the NFC tag unit 210 and the NFC reader/writer unit 220. The NFC device box 240 enables NFC-related devices to be located in a single location so that when a user of the MFP 1000 wishes to use the MFP 1000's NFC-related devices, the user knows where over the MFP 1000 to hold the NFC card 102.

Figure 4:
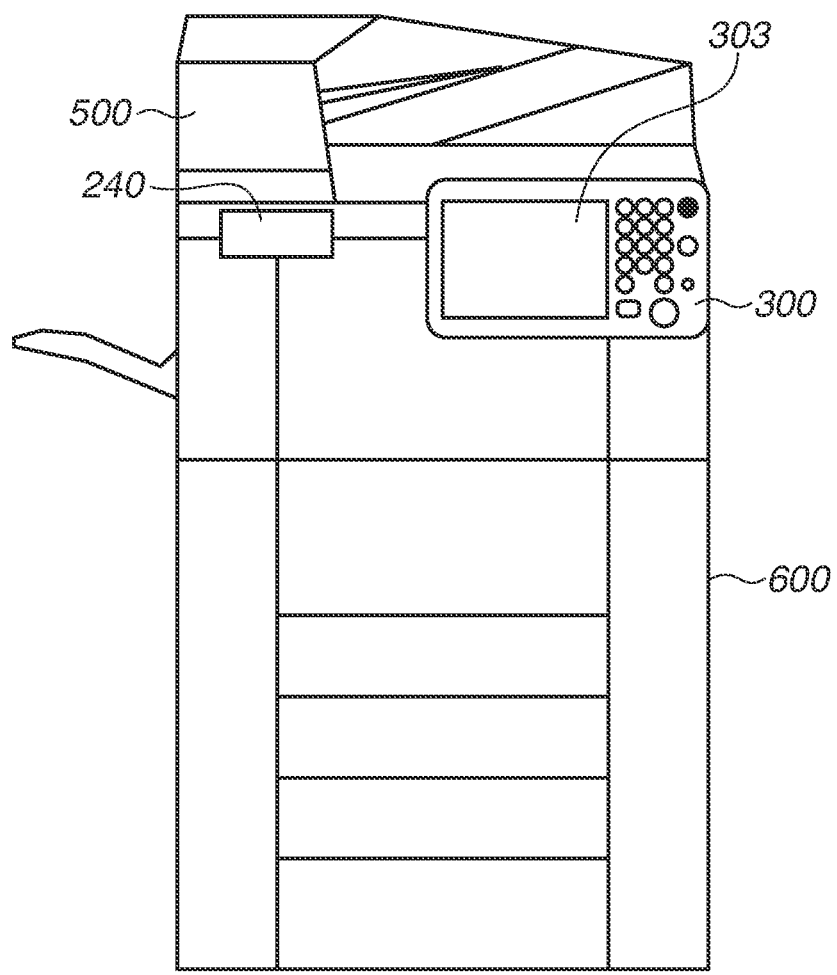
FIG. 4 is a diagram illustrating an example where the NFC device box is installed near an operation unit.

As illustrated in FIG. 4, the NFC device box 240 is installed in proximity, i.e., within a set distance, to an operation unit 300 of the MFP 1000. The operation unit 300 includes a key/light-emitting diode (LED) 301, the CPU 302, and a liquid crystal display (LCD) 303.

The CPU 302 can control a setting for permitting or stopping a radio frequency (RF) operation of the NFC tag circuit 212. If the RF operation is permitted, the NFC tag circuit 212 responds to a reading request from the NFC reader/writer unit 220. If the RF operation is stopped, the NFC tag circuit 212 does not respond to a reading request from the NFC reader/writer unit 220. The function of permitting or stopping the RF operation can be switched by the CPU 302 rewriting a register of an NFC communication large-scale integrated (LSI) circuit in the NFC tag circuit 212.

Figure 7:
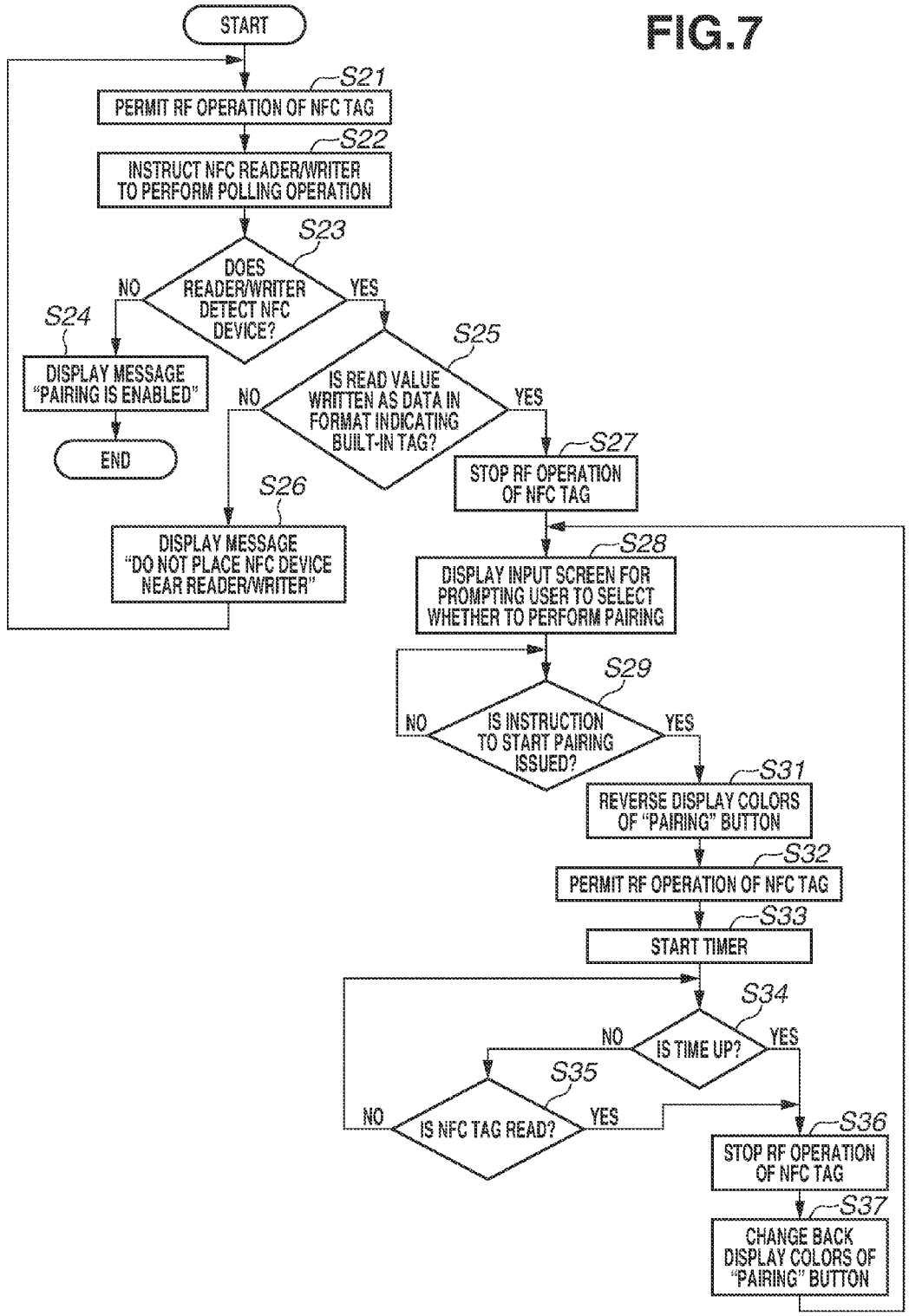
FIG. 7 is a flowchart illustrating information processing.

The function of the MFP 1000 and the processing of flowcharts described below with reference to FIGS. 5, 7, and 8 are implemented by the controller 400 executing processing based on a program stored in a memory of the controller 400.

FIG. 5 is a flowchart illustrating an example of information processing performed by the controller 400. In step S1, the controller 400 reads, from a storage device (not illustrated) in the MFP 1000, the operation setting of the NFC tag unit 210 that is set in advance.

In step S2, the controller 400 determines whether the operation setting of the NFC tag unit 210 is set to a "normal operation". If it is determined that the operation setting is set to the "normal operation" (YES in step S2), the processing proceeds to step S3. If it is determined that the operation setting is set to a "selection operation" (NO in step S2), the processing proceeds to step S7. The process in step S2 is an example of a determination process for determining, based on setting information of a tag unit, whether a normal operation is selected or a selection operation is selected.

In step S3, the controller 400 issues, to the NFC reader/writer unit 220, an instruction to perform a polling operation. The process in step S3 is an example of a first permission process for permitting a polling operation of a reader/writer unit. In step S4, the controller 400 issues an instruction to permit an RF operation of the NFC tag unit 210. The process in step S4 is an example of a third permission process for, in a case where the normal operation is set, permitting an RF operation of the tag unit.

Figure 6A:
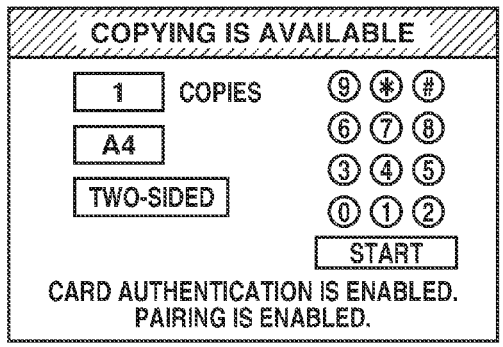
FIGS. 6A, 6B, 6C, 6D, and 6E are diagrams each illustrating examples of screens.

In step S5, the controller 400 causes the LCD 303 to display a screen including a message "pairing is enabled". FIG. 6A illustrates an example of the screen displayed in step S5. The process in step S5 is an example of a second display process for indicating that card authentication is enabled and that pairing is enabled.

Figure 6B:
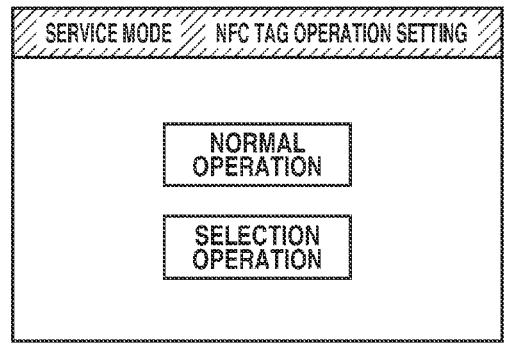

In step S6, the controller 400 determines whether the operation setting of the NFC tag unit 210 is changed. FIG. 6B illustrates a service setting screen for changing the operation setting of the NFC tag unit 210. Selection whether to set the operation setting of the NFC tag unit 210 to the "normal operation" or the "selection operation" is done via the screen illustrated in FIG. 6B. The "normal operation" refers to a state where the RF operation of the NFC tag unit 210 is constantly permitted, enabling the mobile terminal 101 to constantly read information. The "selection operation" is a state where, when a "pairing" button is pressed, the RF operation of the NFC tag unit 210 is temporarily permitted.

An operator changing the operation setting confirms the type of the NFC reader/writer unit 220 and determines which of the normal operation and the selection operation is appropriate. In a case where the NFC reader/writer unit 220 constantly reads the NFC tag unit 210 and prevents the mobile terminal 101 from reading the NFC tag unit 210, the operator sets the "selection operation". In a case where the NFC reader/writer unit 220 does not read the NFC tag unit 210, the operator sets the "normal operation". If it is determined that the operation setting is changed (YES in step S6), the processing proceeds to step S2. If it is determined that the operation setting is not changed (NO in step S6), the process in step S6 is repeated.

In step S7, the controller 400 issues to the NFC reader/writer unit 220, an instruction to perform a polling operation. The process in step S7 is an example of a first permission process for, in a case where the selection operation is set, permitting a polling operation of a reader/writer unit. In step S8, the controller 400 issues an instruction to stop an RF operation of the NFC tag unit 210. The process in step S8 is an example of a first stop process for stopping an RF operation of the tag unit.

Figure 6C:
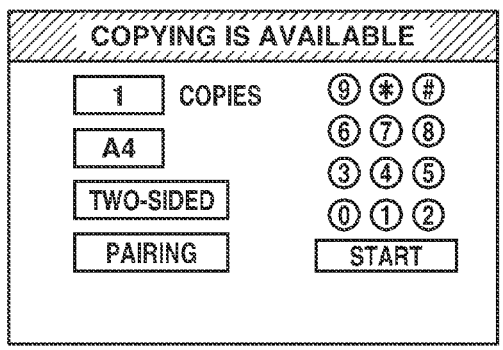

In step S9, the controller 400 displays a "pairing" button on a screen and waits for the "pairing" button to be pressed. FIG. 6C is a diagram illustrating an example of the screen displayed on the LCD 303 in step S9 for prompting the user to input a selection of whether to perform pairing. The process in step S9 is an example of a first display process for displaying a screen for prompting a user to select whether to perform pairing. The "pairing" button is an example of an instruction button.

In step S10, the controller 400 determines whether an instruction to start pairing is issued, i.e., whether the pairing button is pressed. If it is determined that the instruction to start pairing is issued (YES in step S10), the processing proceeds to step S12. If it is determined that the instruction to start pairing is not issued (NO in step S10), the processing proceeds to step S11. In step S11, the controller 400 determines whether the operation setting of the NFC tag unit 210 is changed. If it is determined that the operation setting of the NFC tag unit 210 is changed (YES in step S11), the processing proceeds to step S2. If it is determined that the operation setting of the NFC tag unit 210 is not changed (NO in step S11), the processing returns to step S10.

Figure 6D:
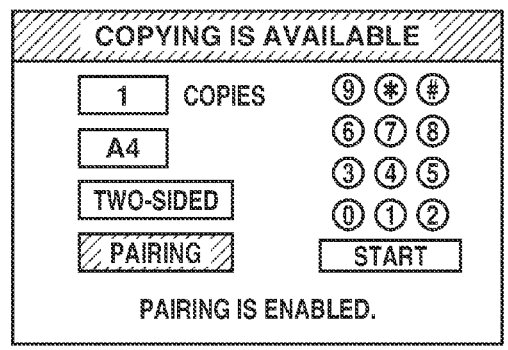

In step S12, the controller 400 reverses the display colors of the "pairing" button on the screen. FIG. 6D illustrates an example of the screen in step S12. The "pairing" button in FIG. 6D is an example of a pairing button for giving an instruction to perform pairing. The process in step S12 is an example of a first change process for, in a case where an instruction to start pairing is issued via a pairing button on the screen, changing the display of the button. FIG. 6D illustrates an example where the display colors of the button are reversed. Alternatively, the button can be highlighted by changing the colors of the button or causing the button to blink.

In step S13, the controller 400 issues an instruction to permit the RF operation of the NFC tag unit 210. The process in step S13 is an example of a second permission process for, in a case where an instruction to start pairing is issued via the screen, permitting the RF operation of the tag unit.

In step S14, the controller 400 starts a timer. In step S15, the controller 400 determines whether time has elapsed. If it is determined that time has elapsed (YES in step S15), the processing proceeds to step S17. If it is determined that time has not elapsed (NO in step S15), the processing proceeds to step S16.

In step S16, if the NFC tag unit 210 is read, the NFC tag circuit 212 notifies, via UART communication, the controller 400 that the NFC tag unit 210 is read. The controller 400 determines whether this notification is received. If the notification is received, the controller 400 determines that the NFC tag unit 210 is read (YES in step S16). The processing then proceeds to step S17. If the notification is not received, the controller 400 determines that the NFC tag unit 210 is not read (NO in step S16). The processing then returns to step S15.

In step S17, the controller 400 issues an instruction to stop the RF operation of the NFC tag unit 210. The process in step S17 is an example of a second stop process for, in a case where a set condition is satisfied, stopping the RF operation of the tag unit. In step S18, the controller 400 changes back the display colors of the "pairing" button to the previous colors. The process in step S18 is an example of a second change process for, in a case where the RF operation of the tag unit is stopped, changing back the display of the button to the previous state.

In step S19, the controller 400 determines whether the operation setting of the NFC tag unit 210 is changed. FIG. 6B illustrates a service setting screen for changing the operation setting of the NFC tag unit 210. Selection whether to set the operation setting of the NFC tag unit 210 to the "normal operation" or the "selection operation" is done via the screen illustrated in FIG. 6B.

In a second exemplary embodiment, when the MFP 1000 is turned on, it is determined whether the NFC reader/writer unit 220 reads the NFC tag. If the NFC reader/writer unit 220 does not read the NFC tag, the RF operation of the NFC tag is constantly permitted. If the NFC reader/writer unit 220 reads the NFC tag, the RF operation of the NFC tag is stopped unless pairing is performed. Information processing according to the present exemplary embodiment will be described with reference to FIG. 7.

When the MFP 1000 is turned on, in step S21, the controller 400 issues an instruction to permit an RF operation of the NFC tag unit 210. The process in step S21 is an example of a first permission process for permitting an RF operation of a tag unit.

In step S22, the controller 400 issues, to the NFC reader/writer unit 220, an instruction to perform a polling operation. The process in step S22 is an example of a second permission process for permitting a polling operation of a reader/writer unit.

In step S23, the controller 400 determines whether the NFC reader/writer unit 220 detects any NFC device. If it is determined that an NFC device is detected (YES in step S23), the processing proceeds to step S25. If it is determined that no NFC device is detected (NO in step S23), the processing proceeds to step S24. The process of the determination in step S23 is an example of processing performed when the MFP 1000 is started.

Figure 6E:
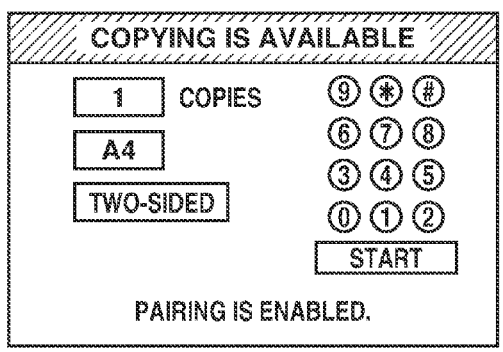

In step S24, the controller 400 displays on the LCD 303 a message "pairing is enabled". FIG. 6E illustrates an example of the screen displayed in step S24. That is, the controller 400 determines that both the NFC reader/writer unit 220 and the NFC tag unit 210 are in a state of constant operation.

In step S25, the controller 400 analyzes NDEF data and determines whether Device Info TLV Value="maker MF8500C Series", which indicates a built-in NFC tag unit, holds true. If it is determined that the read value is written as data in a format indicating a built-in tag (YES in step S25), the processing proceeds to step S27. If it is determined that the read value is not written as data in a format indicating a built-in tag (NO in step S25), the processing proceeds to step S26. In step S26, the controller 400 displays on the LCD 303 a message "do not place NFC device near reader/writer".

In step S27, the controller 400 issues, to the NFC tag unit 210 that is built into the controller 400, an instruction to stop the RF operation. The process in step S27 is an example of a first stop process for, in a case where the reader/writer unit detects the tag unit, stopping the RF operation of the tag unit. More specifically, the controller 400 causes the NFC reader/writer unit 220 to operate and stops the operation of the NFC tag unit 210. The series of processes in step S27 and the subsequent steps is an example of processing for causing the NFC tag to operate according to a user instruction.

In step S28, the controller 400 displays on the LCD 303 a screen for prompting the user to input a selection of whether to perform pairing. FIG. 6C illustrates an example of the screen displayed in step S28.

In step S29, the controller 400 waits for a pairing instruction. If it is determined that an instruction to start pairing is not issued (NO in step S29), the process in step S29 is repeated. If it is determined that an instruction to start pairing is issued (YES in step S29), the processing proceeds to step S31. In step S31, the controller 400 reverses the display colors of the "pairing" button. FIG. 6D illustrates an example of the screen displayed in step S31.

In step S32, the controller 400 issues an instruction to permit the RF operation of the NFC tag unit 210. The process in step S32 is an example of a third permission process for, in a case where an instruction to start pairing is issued via the screen, permitting the RF operation of the tag unit. More specifically, the controller 400 stops the operation of the NFC reader/writer unit 220 and causes the NFC tag unit 210 to operate.

In step S33, the controller 400 starts a timer. In step S34, the controller 400 determines whether time has elapsed. If it is determined that time elapsed (YES in step S34), the processing proceeds to step S36. If it is determined that time did not elapsed (NO in step S34), the processing proceeds to step S35. The process in step S34 is an example of the process of determining whether a predetermined time elapses since the NFC tag has been caused to operate.

In step S35, if the NFC tag unit 210 is read, the NFC tag circuit 212 notifies, via UART communication, the controller 400 that the NFC tag is read. The controller 400 determines whether this notification is received. If the notification is received, the controller 400 determines that the NFC tag unit 210 is read (YES in step S35). The processing then proceeds to step S36. If the notification is not received, the controller 400 determines that the NFC tag unit 210 is not read (NO in step S35). The processing then returns to step S34.

In step S36, the controller 400 stops the RF operation of the NFC tag unit 210. The process in step S36 is an example of a second stop process for, in a case where a set condition is satisfied, stopping the RF operation of the tag unit. More specifically, the controller 400 causes the NFC reader/writer unit 220 to operate and stops the operation of the NFC tag unit 210. In step S37, the controller 400 changes the display colors of the "pairing" button back to the previous colors.

In a third exemplary embodiment, a first operation mode, in which the NFC reader/writer is operated and the NFC tag is not operated, and a second operation mode, in which the NFC tag is operated and the NFC reader/writer is not operated, are alternately repeated. This eliminates the need for the user to press a button to issue an instruction to perform pairing. Information processing according to the present exemplary embodiment will be described with reference to FIG. 8.

In step S41, the controller 400 indicates on the LCD 303 that a pairing operation is enabled. FIG. 6E illustrates an example of the screen displayed in step S41. In step S42, the controller 400 issues an instruction to stop a polling operation of the NFC reader/writer unit 220. The process in step S42 is an example of a first stop process for stopping a polling operation of a reader/writer unit. The process in step S42 is also an example of the process of, in a case where a set time elapses, stopping the polling operation of the reader/writer unit. In step S43, the controller 400 issues an instruction to permit an RF operation of the NFC tag unit 210. The process in step S43 is an example of a first permission process for, after the polling operation of the reader/writer unit is stopped, permitting an RF operation of a tag unit.

In step S44, the controller 400 starts a timer, e.g., a 500-msec timer. In step S45, the controller 400 determines whether, based on the timer, time has elapsed. If it is determined that time has elapsed (YES in step S45), the processing proceeds to step S46. If it is determined that time has not elapsed (NO in step S45), the process in step S45 is repeated.

In step S46, the controller 400 issues an instruction to stop the RF operation of the NFC tag unit 210. The process in step S46 is an example of a second stop process for, in a case where a set time elapses, stopping the RF operation of the tag unit.

In step S47, the controller 400 instructs the NFC reader/writer unit 220 to perform the polling operation. The process in step S47 is an example of a second permission process for, after the RF operation of the tag unit is stopped, permitting the polling operation of the reader/writer unit. In step S48, the controller 400 starts a timer. At this time, for example, a 500-msec timer is used.

In step S48, the controller 400 starts a timer, e.g., a 500-msec timer. In step S49, the controller 400 determines whether, based on the timer, time has elapsed. If it is determined that time has elapsed (YES in step S49), the processing returns to step S42. If it is determined that time has not elapsed (NO in step S49), the process in step S49 is repeated.

In the example of the present embodiment, both operation modes are switched every 500 msec. Thus, when the NFC card 102 or the mobile terminal 101 is held over an antenna, it can take up to 500 msec until either function starts to operate. The setting of this wait time can be determined based on the response time of a command from each of the NFC reader/writer unit 220 and the NFC tag unit 210 in response to a command sent from the controller 400.

While exemplary embodiments have been described, these exemplary embodiments are not seen to be limiting. For example, the hardware configuration of the MFP 1000 is not limited to that in FIG. 1. Alternatively, a plurality of controllers or a plurality of LCDs can be included.

As described above, according to the processing of the above exemplary embodiments, a reader for reading a card and a proximity wireless communication tag can be appropriately operated.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-004597, filed Jan. 13, 2016, which is hereby incorporated by reference herein in its entirety.

What is claimed is:

1. A printing apparatus comprising:
a card reader configured to read a card for user authentication;
a near field communication (NFC) tag;
a memory that stores instructions; and
a processor that executes the instructions to:
determine whether the card reader reads the NFC tag; and
determine, based on a result of determining whether the card reader reads the NFC tag, an operation method of the NFC tag.

2. The printing apparatus according to claim 1, wherein, in a case where it is determined that the card reader does not read the NFC tag, the operation method of the NFC tag is determined to be that the NFC tag constantly operates.

3. The printing apparatus according to claim 1, wherein, in a case where it is determined that the card reader reads the NFC tag, the operation method of the NFC tag is determined to be that the NFC tag operates according to a user instruction.

4. The printing apparatus according to claim 1,
wherein, in a case where it is determined that the card reader does not read the NFC tag, the operation method of the NFC tag is determined to be that the NFC tag constantly operates, and
wherein, in a case where it is determined that the card reader reads the NFC tag, the operation method of the NFC tag is determined to be that the NFC tag operates according to a user instruction.

5. The printing apparatus according to claim 4, wherein, in a case where the NFC tag operates according to a user instruction, operation of the NFC tag starts when a user instruction to use the NFC tag is input to the printing apparatus.

6. The printing apparatus according to claim 5, wherein, in a case where a predetermined time elapses since a start of the operation of the NFC tag, the operation of the NFC tag stops.

7. The printing apparatus according to claim 5, wherein, in a case where the NFC tag is read by an external apparatus, the operation of the NFC tag stops.

8. The printing apparatus according to claim 1, wherein, in a case where information read by the card reader is information indicating the NFC tag, it is determined that the card reader reads the NFC tag.

9. The printing apparatus according to claim 1 wherein determining whether the card reader reads the NFC tag is part of processing performed when the printing apparatus is turned on.

10. The printing apparatus according to claim 1,
wherein, in a case where the card reader does not read information, it is determined that the card reader does not read the NFC tag, and
wherein, in a case where the card reader reads information and the read information is information indicating the NFC tag, it is determined that the card reader reads the NFC tag.

11. The printing apparatus according to claim 10, further comprising a display, wherein, in a case where the card reader reads information and the read information is not information indicating the NFC tag, the display displays a message indicating not to place a device near the card reader.

12. A method, executed by a printing apparatus including a card reader configured to read a card for user authentication and a near field communication (NFC) tag, for determining an operation method of the NFC tag, the method comprising:
  determining whether the card reader reads the NFC tag; and
  determining, based on a result of determining whether the card reader reads the NFC tag, the operation method of the NFC tag.

13. The method according to claim 12,
wherein, in a case where it is determined that the card reader does not read the NFC tag, the operation method of the NFC tag is determined to be that the NFC tag constantly operates, and
wherein, in a case where it is determined that the card reader reads the NFC tag, the operation method of the NFC tag is determined to be that the NFC tag operates according to a user instruction.

14. A non-transitory computer readable storage medium storing computer executable instructions that, when executed by a printing apparatus including a card reader configured to read a card for user authentication and a near field communication (NFC) tag, cause the printing apparatus to execute a method for determining an operation method of the NFC tag, the method comprising:
  determining whether the card reader reads the NFC tag; and
  determining, based on a result of determining whether the card reader reads the NFC tag, the operation method of the NFC tag.

15. The non-transitory computer readable storage medium according to claim 14,
wherein, in a case where it is determined that the card reader does not read the NFC tag, the operation method of the NFC tag is determined to be that the NFC tag constantly operates, and
wherein, in a case where it is determined that the card reader reads the NFC tag, the operation method of the NFC tag is determined to be that the NFC tag operates according to a user instruction.

* * * * *